Figure 13:
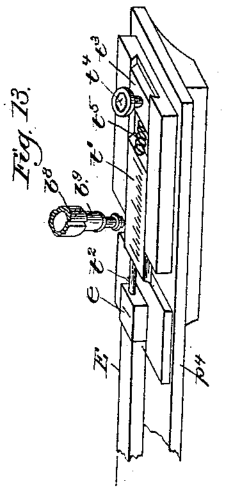

(No Model.) 3 Sheets—Sheet 1.
W. A. ROGERS & G. M. BOND.
COMPARATOR.
No. 332,110. Patented Dec. 8, 1885.
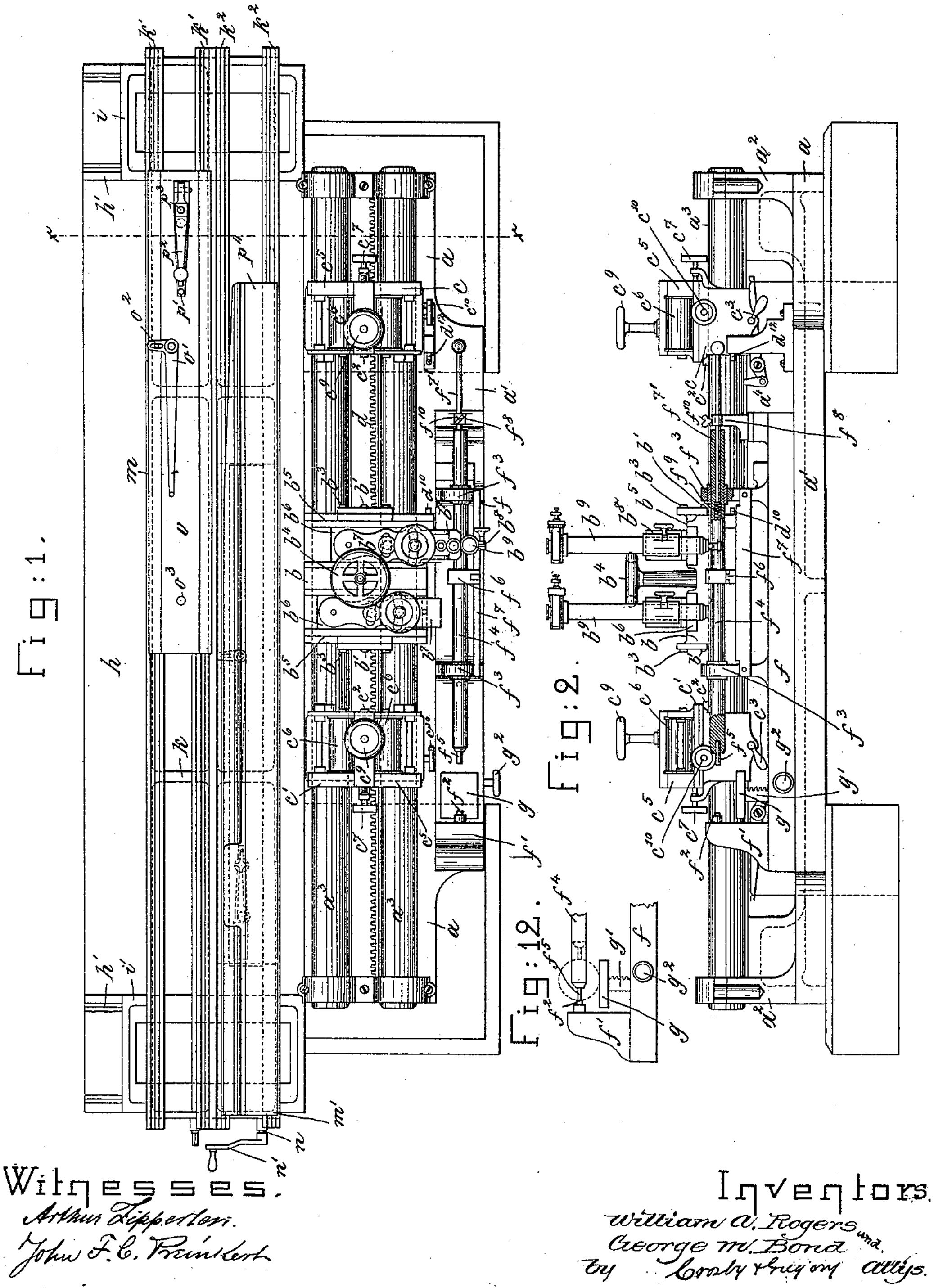
Fig:1. Fig:2. Fig:12.
Witnesses.
Arthur Lipperlein.
John F. C. Prinkert
Inventors.
William A. Rogers and
George M. Bond
by Crosby & Gregory Attys.
N. PETERS. Photo-Lithographer. Washington, D. C.

(No Model.) 3 Sheets—Sheet 2.
W. A. ROGERS & G. M. BOND.
COMPARATOR.
No. 332,110. Patented Dec. 8, 1885.
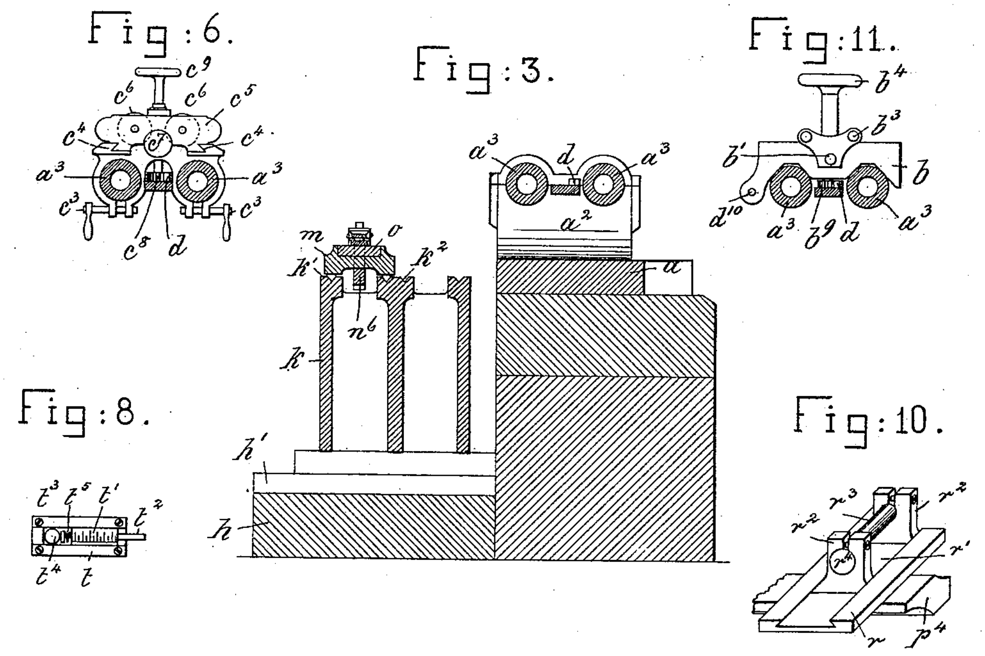
Fig: 6. Fig: 3. Fig: 11. Fig: 8. Fig: 10.
Fig: 4.
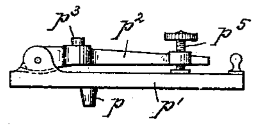
Fig: 5.
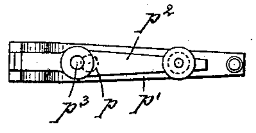
Fig: 7.
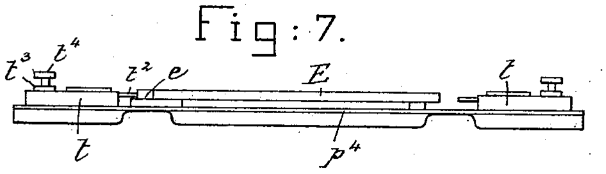
Fig: 9.
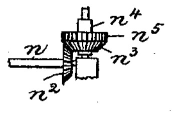
Witnesses.
Arthur Lipperlen.
John F. C. Prinkert
Inventors
William A. Rogers and
George M. Bond,
by Crosby + Gregory attys
N. PETERS, Photo-Lithographer, Washington, D. C.

(No Model.) 3 Sheets—Sheet 3.

W. A. ROGERS & G. M. BOND.

COMPARATOR.

No. 332,110. Patented Dec. 8, 1885.

Witnesses:
J. A. Rennie
W. H. Sigston

Inventors,
William A. Rogers
and George M. Bond
per Crosby & Gregory.
their Attys.

N. PETERS. Photo-Lithographer, Washington, D. C.

UNITED STATES PATENT OFFICE.

WILLIAM A. ROGERS, OF BOSTON, MASSACHUSETTS, AND GEORGE M. BOND, OF HARTFORD, CONNECTICUT.

COMPARATOR.

SPECIFICATION forming part of Letters Patent No. 332,110, dated December 8, 1885.

Application filed December 15, 1884. Serial No. 150,412. (No model.)

*To all whom it may concern:*

Be it known that we, WILLIAM A. ROGERS, of Boston, (Cambridge,) county of Middlesex, and State of Massachusetts, and GEORGE M. BOND, of the city and county of Hartford, and State of Connecticut, have invented an Improvement in Comparators, of which the following description, in connection with the accompanying drawings, is a specification, like letters on the drawings representing like parts.

Our invention relates to a comparator or apparatus for accurately comparing linear measures, and has as it main object to facilitate the work, enabling the tests to be made with greater rapidity, but with no less accuracy, than by apparatus employed for this purpose prior to our invention.

The invention consists in novel appliances for comparing standards of linear measure, including a comparison of line-measure with end measure, or, in other words, bars on which the standard of length is indicated by graduations or lines marked on one side of the bar near its ends, the bar being longer than the standard, and being called a "line-measure bar," and bars which represent the standard of length by the total distance between the extreme ends of the bar, and are called "end measures."

The use of the apparatus involves new methods of comparing, which will be hereinafter explained.

The invention also consists in appliances for rapidly and correctly testing gages or standards of a cylindrical shape, in which the diameter of the cylinder is the standard of length, such gages being used for short standards, usually not over about six inches.

The main portion of the apparatus comprises ways or guides for a traveling carriage, the said ways being constructed with as great accuracy as possible, in order to give the traveling carriage as nearly as possible a rectilinear movement, and the said ways are also provided with stops for limiting the movement of the carriage thereon. The said stops are movable on the ways, and adapted to be fixed at any desired point, so as to limit the travel of the carriage to any desired distance less than the entire length of the ways. The carriage is provided with one or more microscopes for observing the graduations or marks on the various standards or bars that are to be compared or investigated.

The invention also consists in appliances for holding the bars and moving them until they are brought into parallelism with the ways and with their surfaces in convenient range of the microscope. The microscope-carriage and the adjustable stops therefor are provided with electro-magnetic clamps or holders, one of the said members being provided with an electro-magnet and the other with an armature arranged to hold the said carriage and stop in engagement with a definite pressure exerted between the said carriage and stop.

Further details of the invention will be hereinafter more fully explained.

Figure 1 is a plan view of a comparator embodying this invention; Fig. 2, a side elevation thereof; Fig. 3, a transverse section on line *x x*, Fig. 1; Figs. 4 to 13, inclusive, details to be referred to, and Fig. 14 a perspective view of the entire apparatus.

The main portion of the comparing and observing appliances are supported on a bed, *a*, having a lateral projection, *a'*, which serves as a table or support to receive the bars or standards to be observed, or, as shown in Figs. 1 and 2, the apparatus for testing the cylindrical gages or standards of short linear measure, which apparatus may be removed when it is desired to use the table for supporting bars. The bed *a* is provided with uprights $a^2$, which receive the ways $a^3$, for the main microscope-carriage *b*, and movable stops *c c'*. The said ways $a^3$ are cylindrical, and made tubular, for the sake of lightness and equality of temperature, and may be provided with intermediate supports, $a^4$, upon levers, which are provided with counterbalancing-weights, so that the upward pressure on the said ways may be adjusted and made to compensate, as nearly as possible, for the downward flexure of the ways produced by gravitation. The stops *c c'* are provided with engaging-points $c^2$, co-operating with engaging-points *b'* on the microscope-carriage, to arrest the movement of the latter along the ways, the said points being preferably of hardened steel, and one of each pair being flat or having a plane engaging-surface, while the other is rounded, so that the surface of contact is very small. The stops $c\ c'$ have a sliding movement on the ways $a^3$, and may be fixed or held stationary at any desired point thereon by suitable clamping devices, $c^3$.

The said stops are provided with ways $c^4$, (see Fig. 6, in which the stop is shown in end elevation,) which ways receive a frame or carriage, $c^5$, having rigidly connected with it electro-magnets $c^6$, co-operating with armatures $b^3$ on the microscope-carriage, (see Fig. 11,) the said frame $c^5$, together with the magnets, being adjustable on the stops $c\ c'$ by suitable adjusting screws, $c^7$, thus regulating the distance between their poles and their armatures when the engaging-points $b'\ c^2$ are in contact, and thereby adjusting the attractive force exerted on the said armature.

A rack, $d$, on the bed co-operates with a pinion, $b^9$, Fig. 11, on the microscope-carriage, actuated by a handle, $b^4$, to enable the said carriage to be moved steadily in approaching the stops, which are also provided with pinions $c^8$, (see Fig. 6,) operated by a handle, $c^9$, facilitating the steady movement of the stops when setting them in proper position on the ways previous to clamping them.

The microscope-carriage $b$ is provided with transverse ways $b^5$, (see Fig. 2,) which receive blocks or slides $b^6$, having adjustably supported thereon microscope-supports $b^7$, to which may be bolted microscope-clamps $b^8$, one only of which is shown in Fig. 1, for receiving a microscope, $b^9$, two of which may thus be held on the said carriage and independently adjusted to project over one or the other side of the ways $d^3$. The microscopes are provided with the usual eye-piece micrometers, affording a graduated or determinate field of vision.

It is obvious that if the ways were accurate, so that the microscope-carriage moved in exactly a rectilinear path, all the points on the said carriage, and consequently the axis or visual lines fixed by the microscopes, would move exactly equal distances each time that the carriage was moved through the space between the stops $c\ c'$; but if the said ways have curvature in a horizontal plane the microscopes will not move an equal distance if one is nearer the center of the carriage than the other, the one projecting the farthest distance on the side away from the center of curvature of the ways having the greatest movement.

In the practical use of our invention it is desirable to determine the amount and direction of the curvature of the ways $a^3$ in a horizontal plane, which is done as follows: A microscope is set preferably, as far as possible at one side of the ways $a^3$, and the space between its different positions when the carriage is placed first in contact with one and then with the other of the stops $c\ c'$ accurately measured by a standard of linear measure supported parallel with the true axis of the stops, or, in other words, a straight line connecting the points $c^2$, and at the same time or subsequently, while the stops remain fixed in the same position, the same or another microscope is set at the other side of the ways, and the distance between its two positions also accurately measured by the same standard or another which has been previously investigated and compared with the one used for the first observation. The distances traversed by the two microscopes will be the length of the different concentric arcs, and the distance between the said microscopes measured transversely to the ways $a^3$ will be the difference between the radii of the said arcs, from which data the radius of curvature of the said arc may be computed, and the curvature of the ways $a^3$, or of the path in which the carriage $b$ moves, is thus known and may be allowed for in the subsequent use of the apparatus, when comparisons are made between the distance passed over at the same time by different microscopes situated at different distances from the ways. The curvature may be assumed to be circular without appreciable error, as the arc is so extremely short.

When two microscopes are placed at equal distances on opposite sides of the ways, or of the central line connecting the engaging-points $c^2$, the actual distance between the said points $c^2$ will be the mean of the distances passed over by the microscopes, and may thus be ascertained without computing the radius of curvature.

One method of comparing line-measure standards is to place one bar, which may be the known standard with which another is to be compared, or to which the other is to be made equal, in position to be observed by a microscope mounted on the carriage $b$, when the said carriage is placed in contact first with one and then with the other of the stops $c\ c'$, and thus adjusting the said stops so that they limit the amount of movement of the microscope to the standard of length, indicated on the bar by marks engraved thereon, or so nearly to the said standard that the terminal marks come within the graduated or determinate field of the microscope when the carriage is in its terminal position. Then, after the stops are fixed and a sufficient number of observations have been taken to prove the uniformity and accuracy of the observations by the microscope, the other bar is substituted for the one first observed, being placed in exactly the same position, and the microscope-carriage again moved from one to the other of the stops, thus traveling exactly the same distance as before, so that the coincidence or amount of deviation of the graduations of the second bar with relation to the first bar may be observed and read by means of the usual eye-piece micrometer; or, if the second bar is to be graduated, this can be accomplished by making the graduations to exactly coincide with those previously observed on the standard-bar.

It is frequently desirable in comparing bars to be able to observe both bars at the same time, which is inconsistent with the method just described. This may be done by placing the two bars side by side and employing two microscopes, as shown in Fig. 2, one for observing each bar; and in order to eliminate the error arising from horizontal curvature of the ways $a^3$ without necessarily calculating the amount of the said error the following method may be employed: A series of observations are first taken with the bar that is to be compared at one side of the standard-bar—as, for instance, between the said bar and the ways—and then another series of observations are taken with the bar to be compared, placed at an equal distance from the standard on the other side thereof without moving the standard itself. Then the mean of the lengths observed on the bar at each side of the standard as apparently equal thereto will be the exact length of the standard.

By the employment of stops for insuring a definite amount of movement of a microscope the different subdivisions of a divided line-measure standard may be compared with one another and the amount of error of each of the said subdivisions with relation to the entire length determined.

In order to compare end measure with line-measure, or to determine whether or not the distance between the extremities of an end-measure bar is equal to the distance between the graduations on the surface of a line-measure bar, the microscope-carriage is provided with a stop or engaging-point, $d^{10}$, and the bed $a$ with a co-operating stop, $d^{12}$, and the line-measure bar is then placed on the bed at one side of the line of movement of the stop $d^{10}$, with the carriage $b$ on the ways $a^3$. The carriage is then moved up until the stops $d^{10}$ $d^{12}$ come in contact, when the microscope will be brought over the graduation at one end of the line-measure bar and an observation made of the said graduation, after which the microscope-carriage will be moved away from the stop $d^{12}$ sufficiently far to place the end-measure bar between the said stops $d^{10}$ $d^{12}$, when the said end-measure bar will be placed between the said stops, and the carriage will be moved toward the stop $d^{12}$ until the end-measure bar is engaged at one end by the said stop $d^{12}$ and at the other end by the stop $d^{10}$. The microscope carriage and microscopes thereon will thus have been moved from the point where the first observation took place a distance equal to the length of the end-measure bar, and by making another observation (in the new position) of the other end of the line-measure bar the coincidence of or difference between the two measures may be determined. In this method a series of observations may be made with the line-measure bar first at one side and then at an equal distance at the other side of the end-measure bar, when the mean of the two series of observations on the line-measure bar will give the true length of the end-measure bar, irrespective of the curvature of the ways.

When it is desired to eliminate the effect of pressure on the end-measure bar and to compare end measure with line-measure in substantially the same way that line-measure is compared with line-measure, the microscope may be placed exactly in the plane of the end of the end-measure bar by the following method, illustrated in Fig. 7, by which also the standard is protected from injury from engagement with the stop $d^{10}$ $d^{12}$:

A short block or piece, $e$, the length of which has been previously determined, is placed in contact with one end of the end-measure bar, which is shown at E, Fig. 7, and a microscope placed exactly over the middle of the said block, or midway between its ends, which may be done by first setting the microscope nearly over the middle of the block and making a mark on the block within the graduated field of the microscope, and observing the position thereof in the said field, then reversing the said block $e$ end for end and making another observation of the mark and bisecting the space in the microscope-field between the two observed positions of the mark, which will thus give the exact middle of the block, and as the length of the block is known the microscope may be set over the plane of contact of the block $e$ and end-measure bar E by moving the microscope-carriage from the middle point thus determined over half the length of the said block $e$, which may be done by measuring the movement of the microscope by another microscope in connection with a suitable standard. In a similar manner another microscope on another carriage or holder may be placed over the other end of the end-measure bar E, after which the said end-measure bar may be removed and a line-measure bar substituted therefor, which may then be compared with the determined length of the end-measure bar, represented by the distance between the two microscopes.

Figure 14:
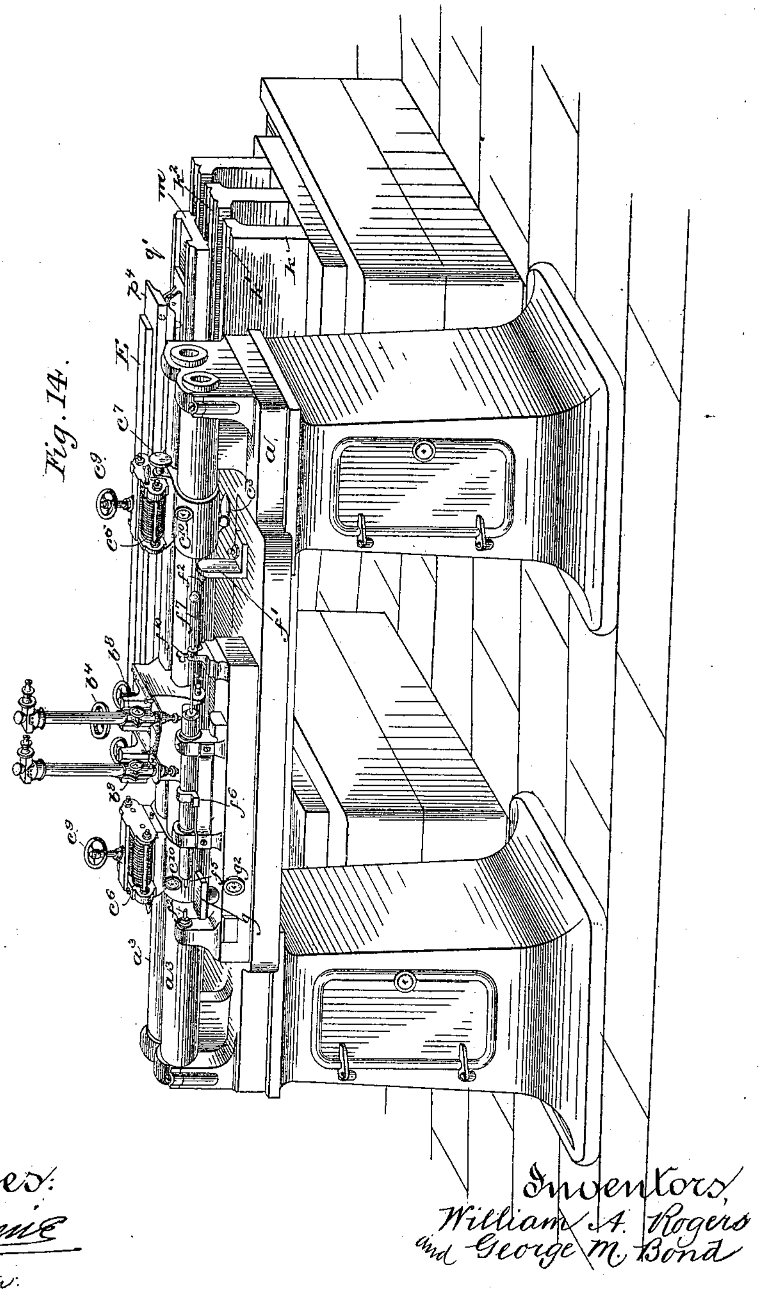

The apparatus shown in Figs. 7, 8, and 13 may also be employed to measure the length of blocks of end measures, such as the one $e$, just described, or the diameter of cylindrical pieces. The table or plate $p^4$, (shown in elevation, Fig. 7,) which may be supported, as hereinafter described, in proper relation to a microscope, is provided with a guide, $t$, (shown in plan in Fig. 8,) containing a longitudinally-movable slide, $t'$, having a stop or contact-piece, $t^2$. The said guide also contains a block, $t^3$, which may be fastened at any desired point in the guide by a clamping-screw, $t^4$. A spring, $t^5$, interposed between the block $t^3$ and slide $t'$, tends to move the latter away from the former.

When the microscope is to be placed over the end of a bar, as last described, the slide $t'$ and contact-piece $t^2$ may be employed to hold the short block in contact with the end of the bar while the observations are being made for the purpose of determining its middle point, the plate $p^4$ being provided with another guide, $t$, and connected parts near its right-hand end, as shown in Fig. 7, corresponding with the one shown near its left-hand end in Fig. 7.

The guide $t$ and connected parts may be used to measure the length of short blocks—such as the one $e$—as follows: The slide $t'$ is provided with a graduated scale, which may be attached thereto; or, as shown in Fig. 8, the graduations may be made on the said slide $t'$ itself. The contact-piece $t^2$ is then permitted to be pressed by the spring $t^5$ against a fixed stop or abutment, (which may be the end of the bar E, for instance,) and an observation made of the graduated scale by a microscope held over it by the microscope-carriage or otherwise. Then the stop $t^2$ is pressed back toward the block $t^3$, and the block $e$ to be measured inserted between the abutment (which has not been moved) and the stop $t^2$, which is then pressed by the spring $t^5$ against the block $e$ with sufficient pressure to insure proper contact at both ends of the block $e$. The graduated scale on the slide $t'$ has thus been moved from the point at which it was first observed a distance just equal to the length of the block $e$, and by making another observation of the scale by the microscope $b^9$, (see Fig. 13,) which remains at the same point as when the first observation was made, the length of the block $e$ is determined.

For testing cylindrical gages in which the diameter is to be an exact standard of length, the slide $t'$ and connected parts may be used, as just described; but when a large number have to be tested the apparatus shown at one side of the ways in Figs. 1 and 2, and partially shown in Fig. 12, may be employed, consisting, essentially, of a bed, $f$, which may be supported on the portion $a'$ of the main bed, and is provided with an upright, $f'$, having a stop, $f^2$, and other uprights, $f^3$, which constitute guides for a longitudinally-movable bar, $f^4$, preferably cylindrical, containing a stop, $f^5$, co-operating with the stop $f^2$ to caliper or span a cylinder or other object placed between the said stops. The bed $f$ is provided with a platform, $g$, for supporting the cylindrical gage to be tested, which gage rests on its side on the said platform, which is vertically adjustable by a rack, $g'$, and pinion on a shaft provided with a handle, $g^2$. The meeting faces of the stops $f^2$ $f^5$ are made exactly plane and at right angles to the line of movement of the bar $f^4$, so that when pressed against the sides of the cylinder they will be tangent thereto, and will place the cylinder with its axis at right angles to the line of movement of the bar $f^4$, so that the distance between the stops $f^2$ $f^5$ will be exactly equal to the diameter of the cylinder, whether the point of contact is at the middle of the stops or somewhat above or below it. The slide-bar $f^4$ has fixed upon it a collar, $f^6$, having a lateral projection resting on and guided by a guide-bar, $f^7$, the said collar carrying a plate having engraved upon it a fine line or series of lines to be observed by the microscope. In testing gages the bar $f^4$ is first moved to place the stops $f^2$ $f^5$ in contact with one another, as shown in full lines, Fig. 12, and the microscope-carriage $b$ then placed with one microscope over the said line or series of lines on the plate, and the other microscope over graduations on a bar which has been investigated and is to constitute the standard from which all the gages are to be made. The slide-bar $f^4$ is then moved away from the stop $f^2$, and a cylinder or gage to be tested laid on the platform $g$, and the stop $f^5$ moved up with the bar $f^4$ until the cylinder is suitably engaged by both stops, as shown in dotted lines, Fig. 12, when the microscope-carriage will be moved until the microscope by which the line on the plate was previously observed is again brought upon the said engraved line, and the distance traveled by the microscope-carriage, which is equal to the diameter of the cylinder, is measured by means of the other microscope on the carriage $b$ in position to observe the standard-bar, which thus gives the exact length of the diameter of the said cylinder, applying the connection for curvature, to which reference has been made.

A uniform pressure of the stop $f^5$ upon the stop $f^2$, or upon the cylinder between the stops $f^5$ $f^2$, may be readily obtained during a series of tests by means of a plunger, $f^{7'}$, working in a guide, $f^8$, and acting on a spring, $f^9$, within the bar $f^4$. When a contact is made, the plunger may be moved until the spring $f^9$ is compressed a definite amount—the same in every case—and the said plunger held by a clamping-screw, $f^{10}$.

It is obvious that a single microscope may be employed, being fixed on and movable with the rod $f^4$, in which case the method of operation will be the same as already described for investigating end-measure bars when placed between the stops $d^{10}$ $d^{12}$.

The apparatus shown in Fig. 1 at the opposite side of the ways $a^3$ from the mechanism last described is intended for supporting bars that are to be investigated, and for readily placing them in a position of parallelism with the axis of the ways $a^3$, part of this apparatus being also shown in section in Fig. 3. It consists, essentially, of a bed, $h$, having ways $h'$, transverse to the ways $a^3$, supporting carriages $i$, in which the ends of a bed or guide, $k$, are vertically adjustable. The said guide $k$ is provided, preferably, with two sets of ways, $k'$ $k^2$, upon which carriages $m$ $m'$ are longitudinally movable by any suitable feeding mechanism, partially shown in plan in Fig. 9, the same consisting, in this instance, of a shaft, $n$, operated by a crank, $n'$, (see Fig. 1,) provided with a bevel-gear, $n^2$, meshing with a bevel-gear, $n^3$, on an arbor, $n^4$, provided with a pinion, $n^5$, meshing with a rack-bar, $n^6$, (see Fig. 3,) fixed upon the under side of the carriage $m$, this mechanism affording a quick longitudinal movement of the carriage $m$, and the bar to be observed indirectly supported thereon, as hereinafter described. The said carriage $m$ contains a slide-plate, $o$, having pivoted thereon a lever, $o'$, (see Fig. 1,) the short arm of which engages a pin, $o^2$, on the carriage $m$, so that by moving the long arm of the said lever a very slow and steady motion is given to the slide-plate $o$. The said plate $o$ has pivot-holes $o^3$, which receive near each end a stud or pivot, $p$, of a lever, $p'$, (shown in elevation and plan in Figs. 4 and 5, enlarged,) having hinged thereon a supporting arm or lever, $p^2$, provided near its fulcrum with a pin, $p^3$, entering an elongated socket in the under side of a plate, $p^4$, upon which the bar to be investigated or other parts to be observed may be supported. The pin $p^3$ is near the fulcrum or pivot of the arm $p^2$, and the extremity of said arm is supported upon a screw, $p^5$, by which it may be raised or lowered, thus producing an extremely slow and steady vertical movement of the end of the plate $p^4$, resting on the said pin $p^3$, which is not in line with the stud $p$, but slightly eccentric thereto, as shown in Fig. 5, so that by rocking the lever $p'$ on the said stud $p$ as a center an extremely slow and steady movement may be imparted to the end of the plate $p^4$ in a direction transverse to the axis of the ways $a^3$. The parts for giving the slow movement to the plate $p^4$ and bar resting thereon (shown enlarged in Figs. 4 and 5) are provided at each end of the slide-plate $o$, so that each end of the plate $p^4$ may be minutely adjusted independently. For greater convenience, the bars to be observed may be supported near each end on a device such as shown in Fig. 10, consisting of a transverse guide, $r$, fixed on the plate $p^4$, provided with a slide or carriage, $r'$, having uprights $r^2$, constituting frictional bearings for the journals of cylinders $r^3$, eccentric to said journals, and provided with a suitable handle, by which it may be rotated, when, owing to its eccentricity, it will raise or lower the end of a bar resting thereon, so as to quickly place it nearly in the focus of the microscope by which the observations are to be made.

The spring-pressed stops $t^2$ (shown in Fig. 7) may be employed to engage both ends of end-measure bars when it is desired to compare end-measure bars directly with one another, first one and then another being inserted between the said stops and observation made each time of the gradations carried by the slides $t'$, the employment of this apparatus insuring that the bars are subjected to equal pressure. The said spring-pressed stops may also be used to compare end-measure bars successively with a line-measure bar, two microscopes being used at each end of the bars, one to observe the line-measure bar and the other to observe the graduation movable with the slide of the spring-pressed stop at the adjacent end of the end-measure bar.

We claim—

1. In a comparator, the combination, with ways, of a microscope-carriage having a substantially-rectilinear movement on the said ways, and a microscope having a determinate field fastened upon said carriage, and stops for the said carriage movable on the said ways, and adapted to be fixed or fastened on the said ways at any desired point, whereby the space passed over by the carriage may be limited to any desired amount, substantially as described.

2. The combination, with the ways and microscope-carriage movable thereon, of the stops for the said carriage, and electro-magnetic holding devices, whereby the said carriage is retained in engagement with the said stops with a definite pressure exerted between them, substantially as described.

3. The microscope-carriage having a rectilinear movement and a microscope fixed thereon having a determinate field, combined with a stationary stop and a co-operating stop on the microscope-carriage movable therewith, whereby the said carriage may be stopped in positions distant from one another by the length of an object interposed between the said stops, substantially as described.

4. A comparator having in combination a table or support for the measures, a way, and microscope-carriage provided with a microscope having a free rectilinear movement on the said way, a block of known length having a graduation about midway between its ends, an end-measure bar supported on said table in contact with the said block, and means for measuring the movement of the microscope, substantially as described.

5. A comparator having in combination a table or support for the objects to be measured, a fixed stop, a co-operating stop having a rectilinear movement, the said stops having plane terminal faces at right angles to the line of movement of the movable stop, and a movable microscope, the movement of which is made equal to that of the movable stop, and is referred to a standard linear measure, substantially as described.

6. A comparator having in combination a bed with a stationary table or support for the measures, ways, and a microscope-carriage movable on the said ways, a stationary stop, and a movable stop at the side of the ways, the said movable stop having a graduation, by observing which in its different positions the movement of the microscope-carriage may be made equal to that of movable stop, substantially as described.

7. The fixed and movable stops for calipering an object, combined with the spring and plunger acting on the said movable stop, whereby the pressure of the latter on the object may be adjusted as desired, substantially as described.

8. The combination, with the ways and microscope supported thereon, with the table for supporting the objects to be investigated, and fast and slow motion devices, whereby the said table may be moved vertically and longitudinally and transversely with relation to the said ways, substantially as described.

9. The combination, with the ways and microscope supported thereon, with the table for supporting the objects to be investigated, and fast and slow motion devices whereby the said table may be moved vertically and longitudinally and transversely with relation to the said ways, and the eccentric bar supporting cylinder $r^3$, substantially as described.

10. The combination, with apparatus for supporting one or more microscopes, of the ways $m$, carriage having a quick motion thereon, slide having a slow motion on said carriage, and plate $p^4$, supported on said slide and having lateral and vertical slow movement at each end independently, substantially as described.

11. The combination, with apparatus for supporting one or more microscopes, of the ways $m$, carriage having a quick motion thereon, slide having a slow motion on said carriage, provided with sockets near its end, levers provided with fulcrum-studs to enter said sockets, and vertically-movable arms pivoted on said levers and provided with pins eccentric to said fulcrum-studs, and a plate supported near its ends on said pins and adjusted by said arms and levers, substantially as described.

12. Two movable spring-pressed stops or contact-pieces, as $t^2$, arranged to engage the ends of an end-measure bar, the said stops being provided with graduations movable therewith, substantially as described.

In testimony whereof we have signed our names to this specification in the presence of two subscribing witnesses.

WILLIAM A. ROGERS.
GEORGE M. BOND.

Witnesses:
JOS. P. LIVERMORE,
W. H. SIGSTON.